Feb. 10, 1931. J. GOETZ ET AL 1,791,758
MILLING MACHINE
Filed July 26, 1926 4 Sheets-Sheet 1

Feb. 10, 1931.   J. GOETZ ET AL   1,791,758
MILLING MACHINE
Filed July 26, 1926    4 Sheets-Sheet 3

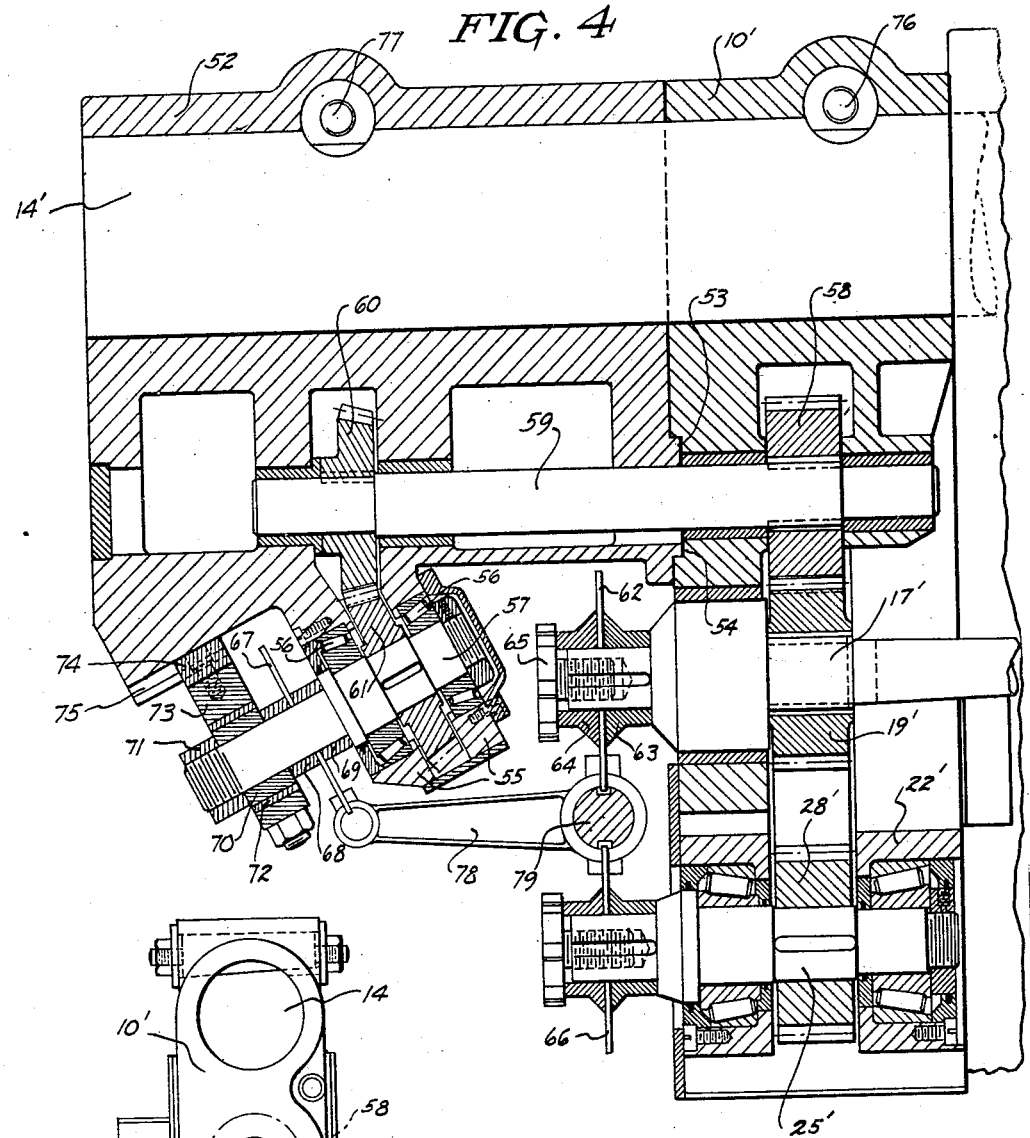
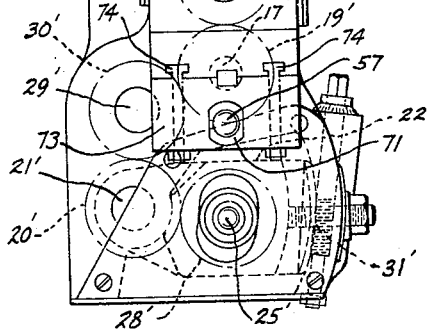

Patented Feb. 10, 1931

1,791,758

UNITED STATES PATENT OFFICE

JOHN GOETZ AND LAWRENCE J. RADERMACHER, OF WEST ALLIS, WISCONSIN, ASSIGNORS TO THE KEMPSMITH MANUFACTURING CO., OF WEST ALLIS, WISCONSIN, A CORPORATION OF WISCONSIN

MILLING MACHINE

Application filed July 26, 1926. Serial No. 124,864.

This invention relates to improvements in milling machines, and more particularly to the supporting and driving mechanism for the tools or cutters.

One of the objects of the present invention is to provide improved means in the form of an attachment adapted for application to a milling machine of standard construction and carrying a plurality of tool spindles connected for operation together, whereby the milling machine may be readily adapted for doing the same work as other machines used heretofore and which have been specially designed for their particular work.

Another object is to provide an improved milling machine adapted to perform at one time the so-called splitting operations on a connecting rod such as is used in internal combustion engines, and to provide such a machine which may be readily changed to perform other work.

Another object is to provide an improved milling machine having a plurality of tool spindles operable to carry tools or cutters for simultaneously performing different operations on the same piece of work, and wherein the spindles are adjustable relatively to each other to accommodate different work.

Other objects and advantages will hereinafter appear.

For the purpose of illustrating the invention several embodiments thereof have been shown in the drawings, in which:

Fig. 4 is a scetional view similar to Fig. 1, showing a modification; and

Fig. 5 is a reduced end elevational view, looking toward the right in Fig. 4.

Figure 2:
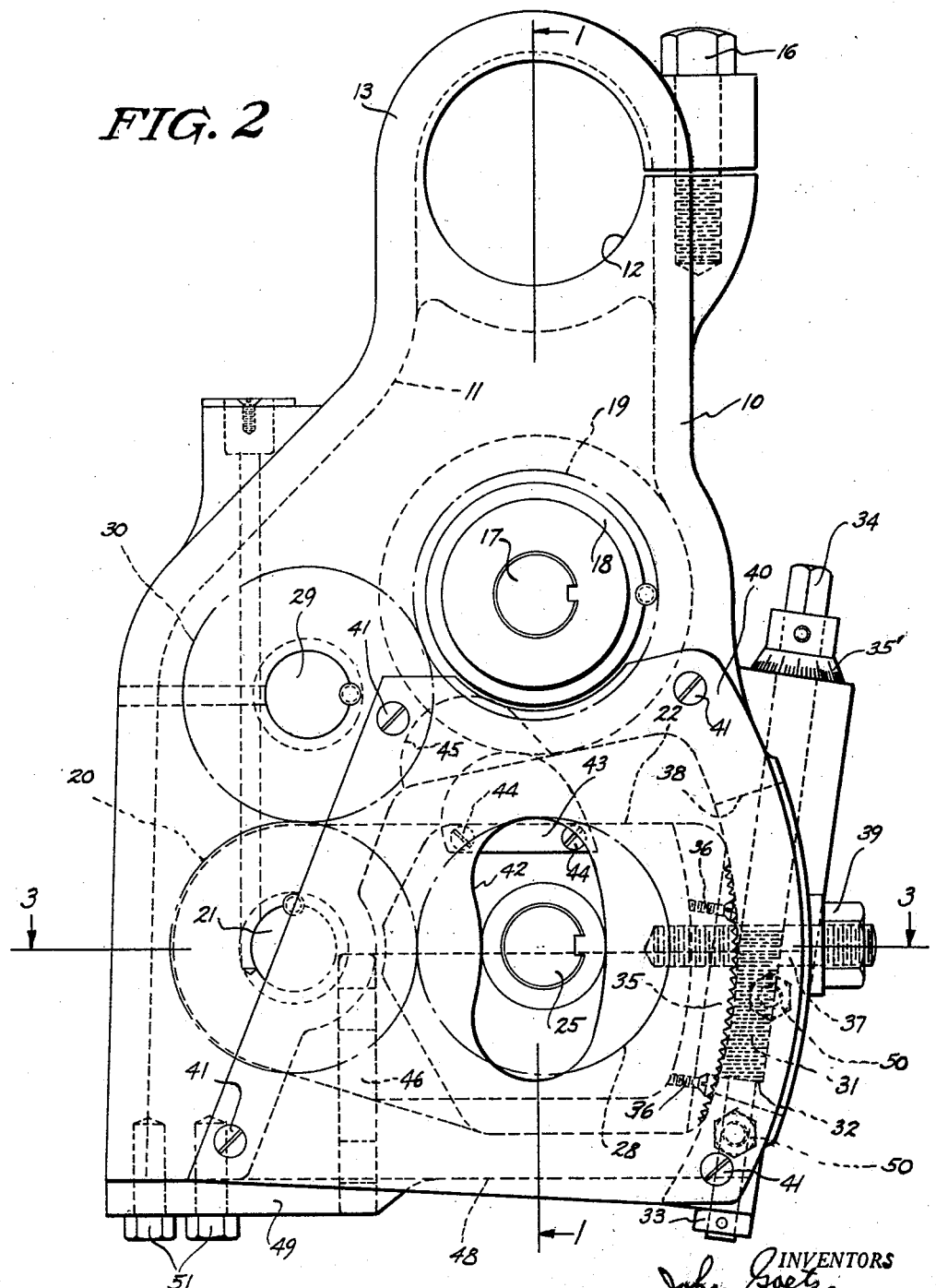
Fig. 2 is an end elevational view, looking toward the right in Fig. 1, some of the parts being removed for the sake of clearness.

The improved attachment includes the hanger 10 provided with the recess 11 and provided with the opening 12 in its upper end 13 for loosely receiving the end of the usual overarm 14 forming part of a horizontal miller of standard constuction and protruding from the column 15 thereof, the end 13 of the hanger being split, as shown in Fig. 2, and a bolt 16 used to clamp the split end tightly upon the overarm. A tool spindle 17 of suitable construction is arranged transversely of the hanger and is journaled in a bushing 18 fixed in the latter, a gear 19 being fixed on this spindle, as shown. A gear 20 is loosely mounted on a pin 21 also arranged transversely of the hanger and supported at its ends thereby. A U-shaped member 22 having its ends 23 and 24 spaced to accommodate gear 20 is loosely mounted at these ends on pin 21 whereby member 22 is supported for pivotal adjusting movement about the axis of the pin. A suitable tool spindle 25 is arranged transversely of member 22 and is journaled in suitable anti-friction bearings 26 and 27 fixed in opposite sides of member 22, as shown, whereby the tool spindle 25 is supported for rotation about an axis parallel to the axis of rotation of spindle 17 and movable with respect to the latter axis about the axis of pin 21 as a center. A gear 28 is fixed on spindle 25 and arranged in mesh with gear 20. A second pin 29 is arranged transversely of hanger 10 and is supported at its ends thereby, a gear 30 being loosely mounted on this pin and arranged in mesh with gears 19 and 20. The tool spindle 17 may be driven directly from the usual machine spindle, and through gears 19, 30, 20 and 28 drives spindle 25. From the foregoing it will be seen that by mounting member 22 at one end thereof for pivotal movement about the axis of pin 21 carrying gear 20, adjusting movement of this member with respect to hanger 10 in no way disturbs the driving connection between the spindles.

For the purpose of causing pivotal adjusting movement of member 22 with respect to hanger 10, a screw 31 is journaled in the hanger and held against axial movement in one direction by the shoulder 32 thereof and in the opposite direction by a suitable collar 33 fixed on the lower end of the screw, the upper end 34 of the latter being squared as shown to receive a suitable wrench and carrying an indicating dial 35'. A worm rack 35 is fixed in the outer end of member 22 by screws 36 and is engaged by screw 31 whereby rotation of the latter in either direction operates to cause adjusting movement of member 22 in the corresponding direction about the axis of pin 21. The adjusting means comprising screw 31 and worm rack 35 being self-locking, it will be understood that the same operates not only to adjust member 22 but to hold the same in adjusted position. Additional means, however, may be provided for holding member 22 in adjusted position independently of screw 31 and rack 35, this means comprising stud bolts 37 extending loosely through slots 38 in hanger 10 and threaded into member 22, nuts 39 being threaded on the ends of the bolts and tightened against the hanger. In changing the adjustment of spindle 25 with respect to spindle 17, therefore, the nuts 39 are first loosened and a suitable wrench applied to the upper end 34 of screw 31 and the latter rotated in the desired direction to adjust member 22, the bolts 37 moving along slots 38 to permit of this movement, after which nuts 39 are again tightened to prevent subsequent movement of member 22 from its position of adjustment by inadvertent rotation of screw 31.

A protecting plate 40 may be placed against the outer face of hanger 10 and secured thereto by screws 41, the plate being provided with an arcuate slot 42 to accommodate spindle 25 and taken about the axis of pin 21 as a center to permit of adjusting movement of the latter. For the purpose of closing slot 42 to prevent the entrance of foreign matter into recess 11 when spindle 25 is in its lower positions, a plate 43 is arranged as shown and secured to member 22 by screws 44, hanger 10 being provided with the recess 45 to receive plate 43 upon upward movement of member 22. Hanger 10 may be held against pivotal movement about overarm 14 by any suitable means such as the bracket shown comprising the flange 46 fixed to column 15 by bolts 47 and the flanges 48 and 49 fixed to the hanger by means of bolts 50 and 51, respectively.

The tools or cutters are placed on spindles 17 and 25 in the usual manner and are held in position by the usual retaining nuts 52 and 53.

From the foregoing it will be seen that any work held in position between spindles 17 and 25 and moved with respect thereto in the usual manner will be operated upon by each of the cutters or tools carried by the spindles, and that the spindle 25 is readily adjustable with respect to spindle 17 to accommodate different work. It will be seen further that by removing bolts 16 and 47 the improved attachment may be readily removed when it is desired to use the milling machine for its usual work.

Figure 1:
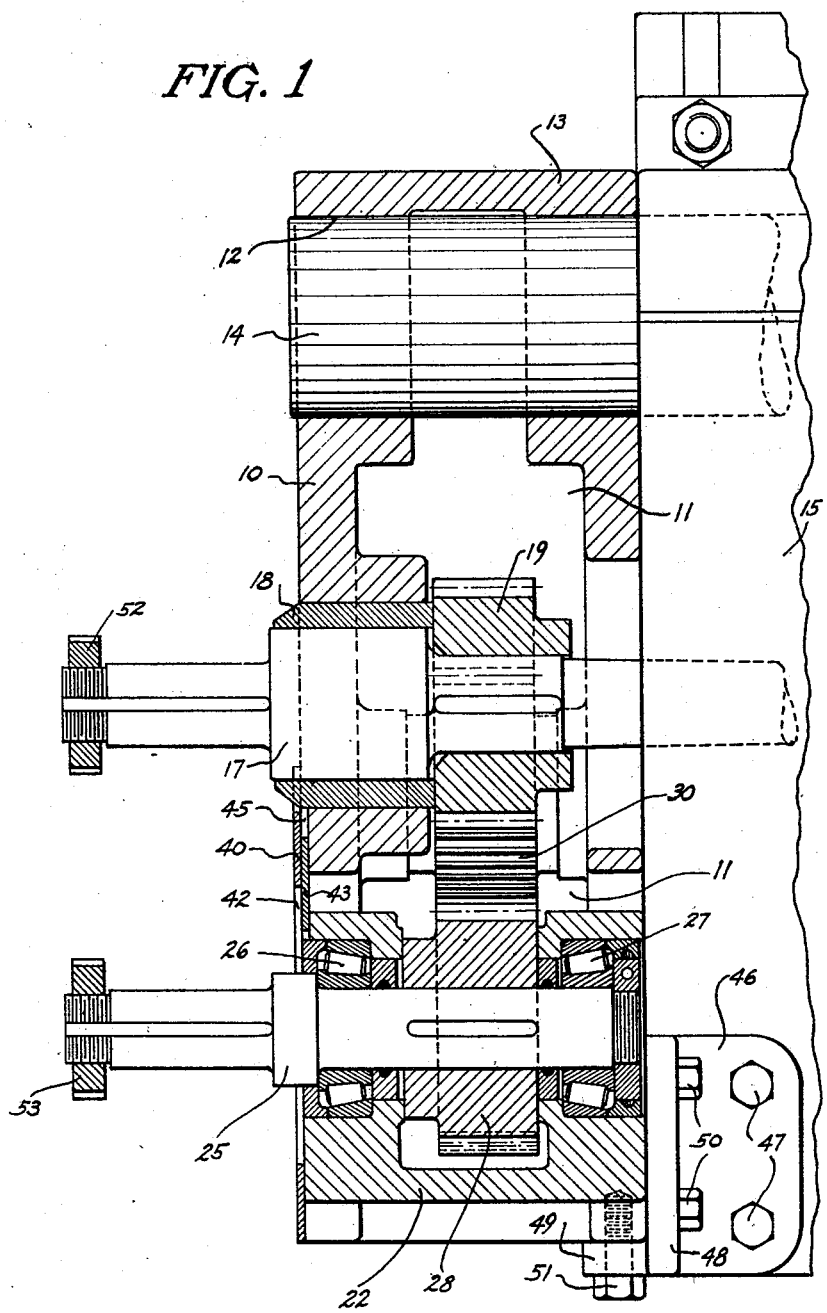
Figure 1 is a vertical sectional view, the section being taken on the line 1—1 in Fig. 2.
Figure 3:
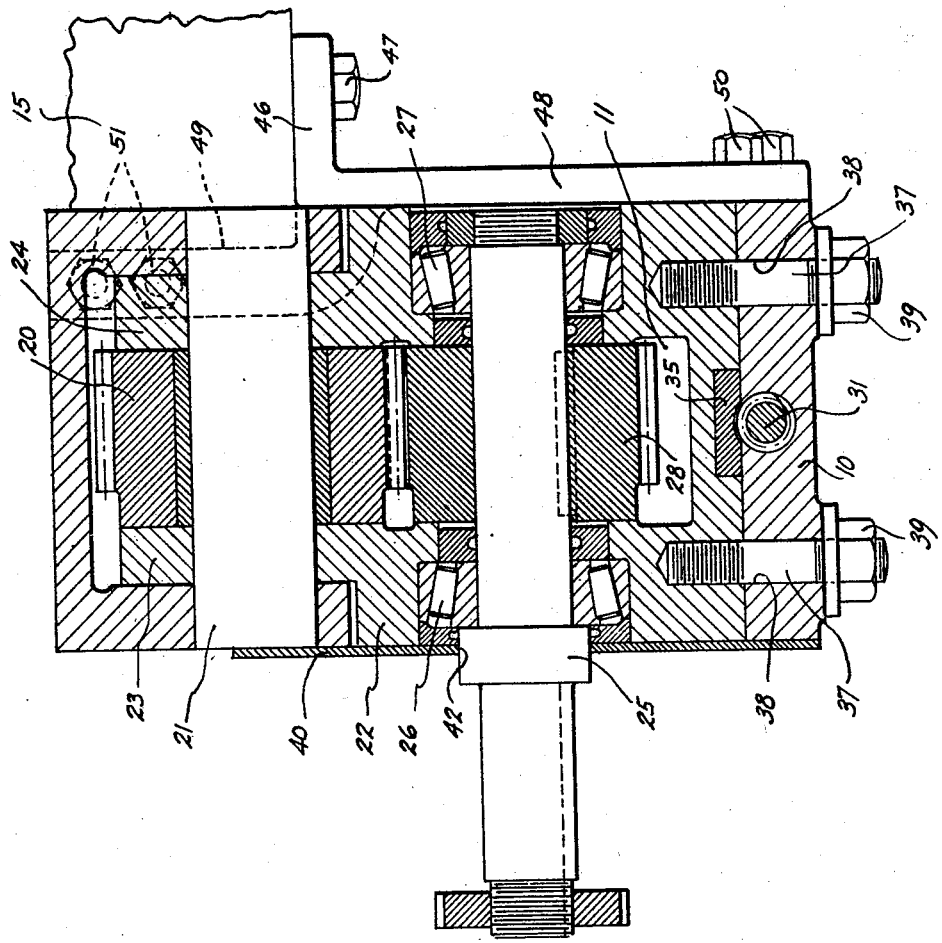
Fig. 3 is a sectional view, taken on the line 3—3 in Fig. 2.

In the modification shown in Figs. 4 and 5 the hanger 10' is constructed substantially the same as hanger 10, and carries the spindle 17' corresponding to the spindle 17. A member 22', corresponding to member 22 in Figs. 1 to 3, carries the spindle 25' and is pivotally mounted at one end on the pin 21' supported at its ends in hanger 10'. The gear 30' mounted on a pin 29' meshes with the gear 19' fixed on spindle 17' and the gear 20' mounted on pin 21', gear 20' in turn meshing with the gear 28' fixed on spindle 25'. Member 22' is adjustable in the same manner as member 22 by rotating the screw 31' in the desired direction. The hanger 10' is provided with the part 52 also fitted on the overarm 14' as shown and provided at one end with the lug 53 arranged to fit in a recess 54 in the adjacent face of hanger 10' to hold part 53 against relative pivotal movement with respect to hanger 10' about the axis of the overarm. The part 52 is provided with the depending spaced lugs 55 carrying the anti-friction bearings 56 in which is journaled the cutter shaft 57, the latter being supported and arranged as shown for rotation about an axis angularly disposed with respect to the axes of rotation of spindles 17' and 25'. The cutter shaft 57 is driven from spindle 17' through the gear 58 meshing with gear 19' and fixed on the shaft 59 journaled in hanger 10' and part 52 for rotation about an axis parallel to the axes of rotation of the spindles 17' and 25', and the bevel gear 60 fixed on shaft 59 and meshing with a similar gear 61 fixed on the cutter shaft 57.

The cutter or tool 62 placed on spindle 17' may be held in position thereon by the spacing collars 63 and 64 and retaining bolt 65 threaded into the end of the spindle, as shown. The tool or cutter 62 may be adjusted along the spindle by substituting for collars 63 and 64 other collars of different sizes. The tool or cutter 66 carried by spindle 25' is held in position, as shown, in the same manner as cutter 62. The cutter 67 carried by shaft 57 is held in position thereon between spacing collars 68 and 69 and the collar 70 and the retaining nut 71 threaded on the end of this shaft. Collar 70 is journaled in a bushing 72 fixed in a block 73 provided at its upper edge with the T-shaped lugs 74 slidably fitted in similarly-shaped grooves 75 in the underside of part 52. From the foregoing it will be seen that by substituting for collars 68 and 69 other collars of different sizes, the tool or cutter 67 may be adjusted axially along shaft 57 to accommodate different work, the block or bearing 73 sliding in the slots 75 to permit of this adjustment and removal and replacement of the tool and spacing collars, block 73 acting further to provide a support for the outer end of shaft 57.

The upper ends of hanger 10' and part 52 are split and bolts 76 and 77 passed through these ends to clamp the hanger and part 52 securely on overarm 14'.

The attachment just described is particularly adapted for performing at one time the three splitting operations on a connecting rod such as the rod 78 shown, the crank end of the latter being mounted on a relatively fixed bar 79 carried by the feed table (not shown) and the other end of the rod being supported by any suitable means also carried by the feed table. From the foregoing it will be seen that an improved attachment has been provided which may be readily applied to a milling machine of standard construction and which operates to perform at one time the three splitting operations on a connecting rod of the type used in internal combustion engines, the tool spindles and the tools or cutters carried thereby being readily adjustable to accommodate work of different sizes.

Several embodiments of applicant's invention have been shown and described, but of course various changes may be made over the construction shown and described such as in the size, shape and arrangement of the parts, without departing from the spirit of the invention or the scope of the claims.

The invention claimed is:

1. In a milling machine having a supporting arm, means in the form of an attachment adapted for application to said machine and comprising a hanger adapted to be applied to said arm, a tool spindle journaled in said hanger, a gear fixed on said spindle, a pin supported at its ends by said hanger, a gear carried by said pin, a member mounted at one end thereof on said pin for pivotal adjusting movement about the axis thereof, a tool spindle journaled in said member, a gear fixed on said last-named spindle and arranged in mesh with said last-named gear, means providing a driving connection between said first and second-named gears and including a second pin supported at its ends by said hanger and a gear carried by said second pin, and means cooperable with said member for causing said adjusting movement thereof.

2. In a machine of the character described, a relatively fixed hanger, a tool spindle journaled in said hanger, a member connected at one end thereof to said hanger for adjustable swinging movement toward and away from said tool spindle, a tool spindle journaled in said member, said member being provided at its other end with a worm rack, and a screw journaled in said hanger and fixed therein against axial movement, said rack being engaged by said screw and cooperating therewith upon rotation thereof to effect said adjusting movement of said member and to hold the latter in adjusted position.

3. An attachment for milling machines including a hanger adapted for fixation to said machine, a pair of tool spindles journaled in said hanger for rotation about substantially parallel axes, means providing a driving connection between said spindles, a cutter shaft journaled in said hanger for rotation about an axis angularly disposed with respect to said first-named axes, and means carried by said hanger and connecting said shaft to one of said spindles for operation thereby, said tool spindles and said cutter shaft being disposed so that the cutters carried thereon are capable of simultaneous action on the work.

4. In a milling machine having a supporting arm, means in the form of an attachment adapted for fixation to said machine and comprising a hanger adapted to be applied to said arm, a pair of tool spindles journaled in said hanger for rotation about substantially parallel axes, means providing a driving connection between said spindles, a cutter shaft journaled in said hanger for rotation about an axis angularly disposed with respect to said first-named axes, and means carried by said hanger and connecting said shaft to one of said spindles for operation thereby, said last-named means including a second shaft journaled in said hanger for rotation about an axis substantially parallel to said first-named axes, said tool spindles and said cutter shaft being disposed so that the cutters carried thereon are capable of simultaneous action on the work.

5. In combination with a milling machine having a drive spindle, an attachment adapted to be connected thereto including a tool spindle adapted to be alined and connected with the drive spindle of the milling machine to be driven thereby, a second tool spindle, a gear train for mechanically connecting said tool spindles, a swingable carrier for the second tool spindle pivotally supported for movement about the axis upon which one of the gears of said gear train rotates for adjusting the second tool spindle toward and away from the first mentioned tool spindle, and means for adjusting said carrier and for holding the same in position whereby the distances between the tool spindles may be accurately adjusted.

6. In a milling machine having a supporting arm, an attachment for said machine comprising a hanger adapted to be applied to said arm, a tool spindle journaled in said hanger, a gear fixed to said spindle, a gear rotatably supported on said hanger, a second tool spindle, a carrier for said second tool spindle supported for swinging movement on the axis of said last mentioned gear, a gear fixed on said second tool spindle and meshed with said last mentioned gear, means providing a driving connection between said first and second named gears, and means cooperable with said carrier for adjusting the same.

In witness whereof, we hereto affix our signatures.

JOHN GOETZ.
LAWRENCE J. RADERMACHER.